(12) United States Patent
Hunt et al.

(10) Patent No.: US 6,430,154 B1
(45) Date of Patent: Aug. 6, 2002

(54) SUPPORTING MULTIPLE APPLICATION TRAFFIC TYPES OVER CONNECTION ORIENTED NETWORKS

(75) Inventors: Douglas H. Hunt, Sudbury, MA (US); Bruce S. Northcote, Burnley (AU)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/636,479

(22) Filed: Aug. 10, 2000

Related U.S. Application Data

(60) Provisional application No. 60/148,809, filed on Aug. 13, 1999.

(51) Int. Cl.$^7$ .................................................. H04L 12/26
(52) U.S. Cl. .............................. 370/230.1; 370/395.43
(58) Field of Search ............................... 370/230, 395, 370/397, 399, 409, 410, 437, 468, 230.1, 236.2, 241.1, 395.1, 395.2, 395.21, 395.3, 395.43

(56) References Cited

U.S. PATENT DOCUMENTS

| | | | | |
|---|---|---|---|---|
| 5,638,371 A | * | 6/1997 | Raychaudhuri et al. | 370/347 |
| 5,689,508 A | | 11/1997 | Lyles | 370/391 |
| 5,726,985 A | * | 3/1998 | Daniel et al. | 370/382 |
| 5,745,697 A | | 4/1998 | Charny et al. | 395/200 |
| 5,754,529 A | * | 5/1998 | Heiss | 370/232 |
| 5,764,645 A | | 6/1998 | Bernet et al. | 370/466 |
| 5,793,747 A | * | 8/1998 | Kline | 370/230 |
| 5,898,669 A | | 4/1999 | Shimony et al. | 370/232 |
| 5,905,711 A | | 5/1999 | Chiussi et al. | 370/232 |
| 5,909,443 A | | 6/1999 | Fichou et al. | 370/412 |
| 6,160,793 A | * | 12/2000 | Ghani et al. | 370/236 |
| 6,167,445 A | * | 12/2000 | Gai et al. | 709/223 |

* cited by examiner

*Primary Examiner*—Chau Nguyen
*Assistant Examiner*—D. Trinh
(74) *Attorney, Agent, or Firm*—Weingarten, Schurgin, Gagnebin & Lebovici LLP

(57) ABSTRACT

A system and a method are disclosed for supporting multiple application traffic types over connection oriented networks. Data is received from multiple applications, for example in the form of data units, and is associated with a traffic type. The traffic type associated with a data unit indicates whether the data unit is inelastic traffic or elastic traffic. Data associated with inelastic traffic is mapped to at least one connection of a first connection type which provides for some amount of committed bandwidth, and limits on delay variation. Data associated with elastic traffic is mapped to at least one connection of a second connection type, which does not provide any committed bandwidth. Connections of the second connection type may ensure that elastic traffic data units that are accepted for transfer by the underlying network are delivered without loss due to network congestion, for example, by use of a flow control technique. A hierarchical scheduler may be employed to schedule transmissions of data units across connections organized into virtual trunks. The hierarchical scheduler may be used to ensure a high multiplexing gain with respect to connections within a single virtual trunk, as well as across multiple virtual trunks.

34 Claims, 4 Drawing Sheets

SUPPORTING MULTIPLE APPLICATION TRAFFIC TYPES OVER CONNECTION ORIENTED NETWORKS

CROSS REFERENCE TO RELATED APPLICATIONS

This application claims priority under 35 USC §119(e) to provisional application Ser. No. 60/148,809, entitled "SUPPORTING IP DIFFERENTIATED SERVICES OVER ATM", and filed Aug. 13, 1999.

STATEMENT REGARDING FEDERALLY SPONSORED RESEARCH OR DEVELOPMENT

N/A

BACKGROUND OF THE INVENTION

The present invention relates generally to computer network and telecommunication technologies, and more specifically to a system and method for supporting multiple application traffic types over a connection based network.

Data associated with different types of applications must often be transferred over a shared communications network. For example, there is a growing need to use a network to transfer data for both what may be referred to as "inelastic" applications, as well as data for what may be referred to as "elastic" applications. "Inelastic" applications are those which cannot tolerate a significant delay variation within the network. Examples of inelastic applications are real time video and/or voice applications. Elastic applications, in contrast, are those which are relatively tolerant of delay variation within the network. Examples of elastic applications include electronic mail and file transfer. In many situations, a customer may desire to use a single network to transfer data associated with both inelastic and elastic applications.

Communications networks are sometimes described as being either "connection-oriented", or "connectionless." For example, the classic model of IP (Internet Protocol) routing is connectionless. A connectionless network such as classic IP is based on packets that are self describing, so that each packet can be treated independently. Accordingly, different packets may take different routes between the same two systems. In contrast, connection-oriented networks establish a fixed route between source and destination, over which all traffic is communicated. Examples of connection oriented network technologies include Asynchronous Transfer Mode (ATM) and Multiprotocol Label Switching (MPLS).

When both inelastic traffic and elastic traffic are to be transmitted over a connection oriented network, a decision may need to be made as to what type or quality of connection to use. For example, some connection types may be more appropriate for inelastic traffic than for elastic traffic, and vice versa. Such a scenario arises, for example, in the case of an end station having an interface to a connection oriented network. When the end station emits data units onto the connection-oriented network, it may need to choose from among connections associated with various types of services in order to define the characteristics of the connection or connections to use for either or both of the inelastic and/or elastic traffic.

A similar problem may arise when mapping services provided over a connectionless network to services offered over a connection-oriented network. A specific example of such a scenario is mapping data units from a traditional IP network onto an ATM network. In this case, the services offered by the IP network may include those based on the IP Differentiated Services model. The services offered by the ATM network do not directly map to the IP Differentiated Services model. This arises from the fact that while ATM Quality of Service (QoS) parameters are absolute, i.e. the service offered to one ATM connection is independent of the service offered to another connection, IP Differentiated Services supports service definitions that are relative, such that the QoS available to one flow depends on that offered to another flow. In addition, the notion of a Per-Hop Behavior is fundamental to the Differentiated Services model. However, a Per-Hop Behavior is fundamentally different from an ATM service category. ATM service categories define services whose performance is specified on an end-to-end basis, while Per-Hop Behaviors describe outcomes observable at individual switches.

More specifically, since IP has traditionally been a "best effort" service, QoS like that provided by ATM networks has been difficult to provide over IP. QOS features would allow ISPs to provide different service levels to different customers. IP Differentiated Services is one mechanism intended to provide QoS-like features over IP.

IP Differentiated Services (also referred to as "DiffServ," or "DS") is a protocol for specifying and controlling network traffic so that certain types of traffic get precedence. For example, voice traffic, which requires a relatively uninterrupted flow of data, might get precedence over other kinds of traffic. In the IP Differentiated Services model, each IP packet is associated with certain forwarding behaviors—known as Per Hop Behaviors (PHBs). A six-bit value stored in a Differentiated Services (DS) field of the Internet Protocol (IP) header is used to store a Differentiated Services Code Point (DSCP), which specifies the per hop behavior. In particular, two per-hop behaviors, Expedited Forwarding (EF) and Assured Forwarding (AF) have been defined. The EF PHB is intended for applications which are based on "inelastic" traffic, such as those that require a "virtual leased line" service, with associated low loss and low delay variation service commitments. The AF PHB is regarded as suitable for applications based on "elastic" traffic, which are more tolerant of delay variation. In this description, references to "inelastic" traffic are intended to indicate IP traffic associated with the Expedited Forwarding PHB, while references to "elastic" traffic are intended to indicate IP traffic associated with the Assured Forwarding PHB.

ATM provides connections that define routes to be used between communicating entities. ATM supports different types of service that may be associated with a connection. The various service categories supported by ATM enable ATM networks to provide what are generally referred to as Quality of Service (QoS) commitments to users of ATM connections. The set of ATM service categories includes Constant Bit Rate (CBR), and Unspecified Bit Rate (UBR) The CBR ATM service category is associated with connections that provide a fixed (static) amount of bandwidth. A CBR connection is characterized by a Peak Cell Rate (PCR) value that is continuously available during the connection lifetime. The connection source may continuously transmit cells at or below the PCR at any time, and for any duration, with the expectation of low loss delivery. The CBR service provides a tightly constrained Cell Delay Variation (CDV). In contrast, the UBR ATM service is a "best effort" service, intended for applications which do not require tightly constrained delay variation, nor a specified quality of service. UBR service supports a high degree of statistical multiplexing across sources, also referred to as a high "multiplexing gain," resulting in improved utilization of network resources. UBR service does not provide traffic related service commitments. Specifically, UBR does not include the notion of a per-connection bandwidth commitment.

The International Telecommunication Union has defined a number of ATM-layer Transfer Capabilities (ATCs) corresponding to the ATM Service Categories. For example, the ITU ATC corresponding to the CBR ATM service category is referred to as DBR (Deterministic Bit Rate) with QoS class 1, and may be written as DBR.1. Similarly, the ATC corresponding to the UBR ATM service category is DBR with an unspecified QoS class, written as DBR.U. In the present disclosure, references to ATM services are used for purposes of illustration, but are intended to indicate the respective ITU ATC designations as well.

Various efforts have been made with regard to supporting the features of the IP Differentiated Services model over connection oriented networks, such as work done by the ATM Forum for ATM networks. From a customer's perspective, there is a need to have the capabilities provided by the IP Differentiated Services model in those cases where some portion of the end to end network includes an ATM network. Network service providers are faced with the need to offer multiple virtual trunks or VPNs, e.g. one virtual trunk per customer, such that each customer has access to features of the IP Differentiated Services model over such virtual trunks or VPNs, also in the case where the underlying network includes an ATM network. Appropriate allocation of resources should allow network service providers to offer such virtual trunks or virtual private networks (VPNs) such that the following objectives are met:

(a) The virtual trunks should be isolated from each other. Traffic segregation between virtual trunks should allow a customer owning a given trunk to have instant access to all the provisioned bandwidth of the trunk at any time, with no impact on the services seen by other customers.

(b) The virtual trunks should be capable of carrying customer traffic having differing relative priorities. Relative priorities within logical trunks should allow service providers to offer qualitative or relative services to a given customer. For example, within a virtual trunk, a service provider should be able to support (i) premium real time services, such as voice over IP (VOIP), (ii) Better than Best Effort (BBE) services, for which the Service Level Agreement (SLA) specifies low loss, and (iii) a best effort (BE) service.

(c) Customers should achieve high multiplexing gain within their virtual trunks. A high multiplexing gain on a virtual trunk could result in higher revenues to a network service provider.

(d) Provisioning should be relatively simple. Simple provisioning is fundamental to the IP Differentiated Services model, where the simplest provisioning model is to establish the bandwidth of a virtual trunk, or a few flow aggregates within a virtual trunk.

(e) Provisioning of trunks across service providers' networks should be possible with a commitment of no loss or minimal loss delivery. The no-loss or minimal-loss transfer commitment over trunks would advantageously force discard control back to the network ingress. This would allow the customer of a network service provider, e.g. an ISP, to have full control over discard control strategies that may be implemented at the network edge.

(f) Work conserving transfer should be achieved within virtual trunks. A work-conserving discipline within virtual trunks would maximize the customer's use of provisioned resources. A work conserving approach should preferably support a combination of inelastic (EF) traffic and elastic (AF) traffic in each trunk.

(g) Work conserving transfer should be achieved across virtual trunks, for example, by allowing elastic traffic from one logical trunk to make use of unused transmission opportunities within another logical trunk. A work-conserving discipline across virtual trunks would further increase utilization, providing additional revenue potential for service providers.

An existing proposal for support of IP Differentiated services over ATM networks, as developed by the ATM Forum, utilizes UBR connections enhanced with an associated per-hop Behavior Class Selector (BCS) value, either by configuration or through signaling procedures. The BCS value associated with a UBR connection allows for qualitative service differentiation between UBR connections. Additionally, the proposal specifies a model in which a mapping is configured between IP Differentiated Service code points and the BCS values used in an operator's network. By means of configuration or signaling, ATM VCs for a given customer are created between points on the edge of the ATM network, in what are referred to as "edge devices" which interface between the IP network and the ATM network. More specifically, included in the configuration process or signaling that sets up a VC is a BCS value. The minimum number of VCs supporting a given customer is the number of distinct behavior classes desired by the customer.

The ATM Forum proposal is expected to provide a high multiplexing gain with regard to elastic traffic. In particular, the Peak Cell Rates (PCRs) of UBR VCs on a common link or transmission facility may be provisioned such that the sum of these PCRs is greater than the actual link capacity. However, a problem exists in that a service provider may not be able to meet the service QoS commitments that ought to be provided to the inelastic flows. This is because the inelastic flows would be mapped to UBR VCs, which have no service commitments.

For the reasons stated above, it would be desirable to have a system for mapping elastic and inelastic traffic types to connections within a connection-oriented network which enables a service provider to meet service commitments appropriate for inelastic flows, and to simultaneously support elastic flows. Moreover, the system should also allow virtual trunks to be used to simultaneously carry both elastic and inelastic traffic, while providing isolation of each virtual trunk from other virtual trunks. Additionally, the system should enable customers to achieve high multiplexing gains on their virtual trunks, employ relatively simple provisioning, and should enable provisioning of virtual trunks across a service provider's network with a commitment of no loss or minimal loss delivery. The system should further achieve work conserving transfer within and across virtual trunks.

BRIEF SUMMARY OF THE INVENTION

In accordance with the present invention, a system and a method are disclosed for supporting multiple application traffic types over connection oriented networks. The disclosed system receives data associated with multiple applications. Such data may, for example, be received in the form of a number of data units, each one of which is associated with a traffic type. The traffic type associated with a data unit indicates whether the data unit is inelastic traffic, which must be transferred consistent with certain delay variation parameters, or elastic traffic, which is not associated with delay variation limits. The received data units may, for example, be IP protocol packets received from a network at an edge device that includes an interface to an ATM network. While the traffic type of a received IP packet may, for example, be determined by examination of a codepoint within a Differentiated Services field within the IP header of the packet, the traffic type may alternatively be determined by examining some combination of header field values defining a packet flow. The specific header fields storing values appropriate for distinguishing between different flows for the purpose of determining a traffic type are implementation dependent, and may or may not include the differentiated services field in the IP packet header.

The disclosed system maps data units that are associated with inelastic traffic to at least one connection of a first connection type. Connections of the first connection type provide for some amount of committed bandwidth, and limits on delay variation. For example, where the disclosed system is implemented within an edge device connecting a network to an ATM network, the disclosed system may map inelastic traffic data units to one or more ATM connections of the Constant Bit Rate (CBR) ATM service category. The connections that the disclosed system maps to received inelastic traffic advantageously provide bandwidth commitments which enable data to be transferred through them at a predetermined data rate and without exceeding a predetermined delay variation.

Data units associated with elastic traffic are mapped to at least one connection of a second connection type. Connections of the second connection type are not associated with any committed bandwidth. However, connections of the second connection type may ensure that elastic traffic data units that are accepted for transfer by the underlying network are delivered without loss due to network congestion. For example, where the connections of the second connection type are flow controlled, the interface to those connections would not permit data units to be accepted by the underlying network unless flow control information permitted that transfer of the data units to take place. Thus, connections of the second connection type may employ a flow control technique which guarantees delivery of accepted data units without loss due to network congestion.

Examples of flow control techniques which guarantee delivery of accepted data units without loss due to network congestion include window based methods such as X.25 and TCP. One example of a flow controlled ATM technique which guarantees delivery of accepted data units without loss due to network congestion, and which may be used for connections of the second connection type, is known as "Controlled Transfer" (CT). Controlled Transfer ATM connections have been described by the International Telecommunication Union (ITU) as an ATM Transfer Capability (ATC), in "ITU Telecommunication Standardization Sector, "Part I of the Report of Working Party 2/13 (Network Capabilities Including B-ISDN and Interworking)", COM 13-R 49-E, Annex 8, March 1999, all disclosures of which are hereby included herein by reference. Controlled Transfer is, like UBR, relatively easy to provision, and additionally supports guaranteed low loss transfer. Also like UBR, CT connections are specified just by means of a PCR. Unlike basic UBR connections, however, CT connections can support a service that guarantees no loss due to congestion over a domain provided by a network operator. This feature enables customer control over discard strategies at an ingress node. Controlled Transfer is an example of an ATM layer mechanism for providing a service that allows a traffic source to transmit at a rate up to a negotiated Peak Cell Rate (PCR), as long as the network indicates that sufficient resources are available. The CT mechanism allows networks to support elastic applications using controls on the number of cells emitted into the network. CT further allows networks to make QoS commitments for elastic applications with stringent cell loss ratio requirements. Access to the network is controlled by a credit-based protocol. ATM CT connections are divided into separately controlled CT segments, and CT flow control occurs between network nodes on each segment. A network operator can use CT to support a service that provides instant access to available network bandwidth, together with a guarantee of no loss due to network congestion.

Mapping the elastic flows to CT VCs enables the network operator to guarantee a low loss transfer across its network. For purposes of illustration, one virtual trunk model using CT connections to carry elastic traffic, contains one CBR VC and one CT VC per virtual trunk. However, multiple connections of the first connection type and/or second connection type may be grouped into a single virtual trunk. As in the embodiment of the disclosed system in which elastic flows are mapped to UBR connections, an embodiment of the disclosed system using CT connections provides virtual trunk traffic isolation, differing relative priorities within a virtual trunk, high multiplexing gain, work conserving transfer within and across the virtual trunks, and relatively simple provisioning. The use of CT VCs also advantageously supports a service that prevents cell loss due to network connection. This results from the fact that cells or cell groupings are not discarded at any interior node.

In order to handle the forwarding of received data units onto connections within multiple virtual trunks, one embodiment of the disclosed system uses what is generally referred to as a hierarchical scheduler. The hierarchical scheduler may provide "weighted" service to certain predetermined connections. The hierarchical scheduler may further be designed to ensure fairness across different connections.

The hierarchical scheduler may be used to ensure a high multiplexing gain with respect to the use of a customer's virtual trunk. The hierarchical scheduler may further be used to take into account the grouping of VCs into virtual trunks. For purposes of illustration, assume that each virtual trunk contains one CBR VC and one UBR VC. In such a case, each customer sees a virtual trunk with a committed bandwidth equal to the PCR of the CBR VC of that virtual trunk. Further, each customer has first priority to use any of their committed bandwidth for either inelastic or the elastic traffic. If at any time, for a given customer, there is no offered inelastic traffic to take advantage of a transmission opportunity, then the hierarchical scheduler checks to see if there is any elastic traffic queued on the customer's UBR VC. If so, an ATM cell from one of the customer's elastic traffic flows is scheduled for transmission. The PCR of the customer's UBR VC should advantageously be set at least as large as the PCR of the customer's CBR VC. If no ATM cells are queued on either the CBR VC or the UBR VC in that customer's virtual trunk, then queued elastic traffic from some other customer's virtual trunk may be scheduled for transmission in a transmission opportunity which would otherwise go unused.

The disclosed system substantially addresses the shortcomings of existing proposals by mapping inelastic traffic to virtual connections having committed bandwidth. In one illustrative embodiment, the PCR of a CBR VC may be set to accommodate the peak rate requirements of each of the inelastic flows mapped onto it. Further, the sum of the PCRs of CBR VCs sharing a common link may be set to be less than or equal to the link capacity. By mapping the inelastic flows to CBR VCs, an embodiment of the disclosed system may enable a network operator to commit to the QoS desired for these flows. Further in an illustrative embodiment, elastic flows may be mapped to VCs which employ a flow control mechanism that prevents cell loss due to congestion within the network, thus retaining the opportunity for high multiplexing gain together with low loss transfer.

The disclosed system advantageously provides not only high multiplexing gain, but also isolation between customers. Each customer's view of the network service is a virtual trunk, such that the customer may consume all the virtual trunk's bandwidth on demand. In an illustrative embodiment, the UBR VCs within a virtual trunk can use transmission opportunities not used by the CBR VC within that virtual trunk, up to the PCR of the CBR VC. In addition, a UBR VC in a given virtual trunk can use available transmission opportunities from other virtual trunks while still maintaining traffic isolation.

The disclosed system is straightforward to provision. In general, a service provider must provision enough bandwidth for the aggregate of the flows within a virtual trunk. In an illustrative embodiment of the disclosed system, the service provider can provision the PCR of the CBR VC to accommodate bandwidth needs of the inelastic flows. Moreover, the service provider can elect to include within the PCR of the CBR VC an additional amount of bandwidth, which then would be available for sharing among the customer's elastic flows.

In this way, an embodiment of the disclosed system uses UBR VCs or VCs with flow control for elastic flows. Such an embodiment provides isolation, multiple traffic priorities, high multiplexing gain, and simple provisioning. UBR VCs may not satisfy a customer's need for a commitment to low loss transfer across an operator's network with regard to elastic traffic. However, embodiments in which connections of the second connection type employ flow control may force discard control back to the ingress node, thus allowing the customer (e.g. an ISP) to have full control over discard control strategies that may be implemented at an ingress node.

Thus there is disclosed a system for mapping elastic and inelastic traffic types to connections within a connection-oriented network which enables a service provider to meet service commitments appropriate for inelastic flows, and to simultaneously support elastic flows. The disclosed system also allows virtual trunks to be used to simultaneously carry both elastic and inelastic traffic, while providing isolation of each virtual trunk from other virtual trunks. Additionally, the disclosed system enables customers to achieve high multiplexing gains on their virtual trunks, employ relatively simple provisioning, and further enables provisioning of virtual trunks across a service provider's network with a commitment of no loss or minimal loss delivery. The disclosed system also achieves work conserving transfer within and across virtual trunks.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

The disclosures of provisional application serial number 60/148,809, entitled "SUPPORTING IP DIFFERENTIATED SERVICES OVER ATM", and filed Aug. 13, 1999, to which this application claims priority under 35 USC §119 (e), are hereby incorporated by reference herein.

Figure 1:
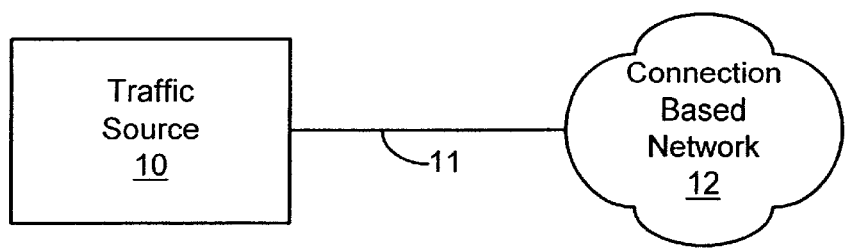
FIG. 1 shows a traffic source interfaced to a connection-oriented network.

As shown in FIG. 1, and consistent with an illustrative embodiment of the invention, traffic source 10 provides both elastic and inelastic traffic to a connection based network 12. The traffic source 10 of FIG. 1 is coupled to the connection based network 11 through a communications link 11. The traffic source 10 may, for example, consist of an end station including a personal computer, workstation, personal digital assistant, or other type of device. The traffic source may, for example, consist of a program execution platform including one or more processors and a memory for storing programs that is coupled to at least one of the processors. The traffic source 10 may further include an input/output subsystem operable to exchange data units with the connection based network 12. The connection based network 12 may be an ATM network, or other type of connection based network, such as a network implementing MPLS.

Figure 2:
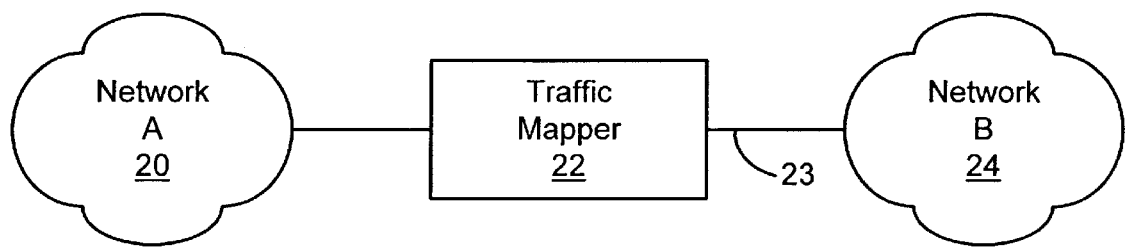
FIG. 2 illustrates a system which interfaces between a first network and a second network.

FIG. 2 shows first network (Network "A" 20) interfaced to a second network (Network "B" 24) through a traffic mapper system 22. The traffic mapper system 22 is coupled to Network B through a communications link 23. For purposes of illustration, Network A 20 is a connectionless network, such as a traditional IP based network, and Network B is a connection-oriented network, such as an ATM or MPLS network. The traffic mapper 22 may be any type of communications device operable to pass data units between Network A 20 and Network B 24, and may include any combination of hardware and software functionality appropriate for a specific application. During operation of the systems shown in FIG. 2, inelastic and elastic traffic from Network A 20 is received by the traffic mapper 22, and mapped to appropriate connections for communication over the link 23 into Network B 24.

A traffic mapping controller that embodies the functionality of the disclosed system with regard to FIG. 1 and FIG. 2 may include software executing on a processor, and/or dedicated hardware circuits. Such a traffic mapping controller may be included within the traffic source 10, the traffic mapper 22, or within an edge device of the connection based network 12 or network B 24.

Figure 3:
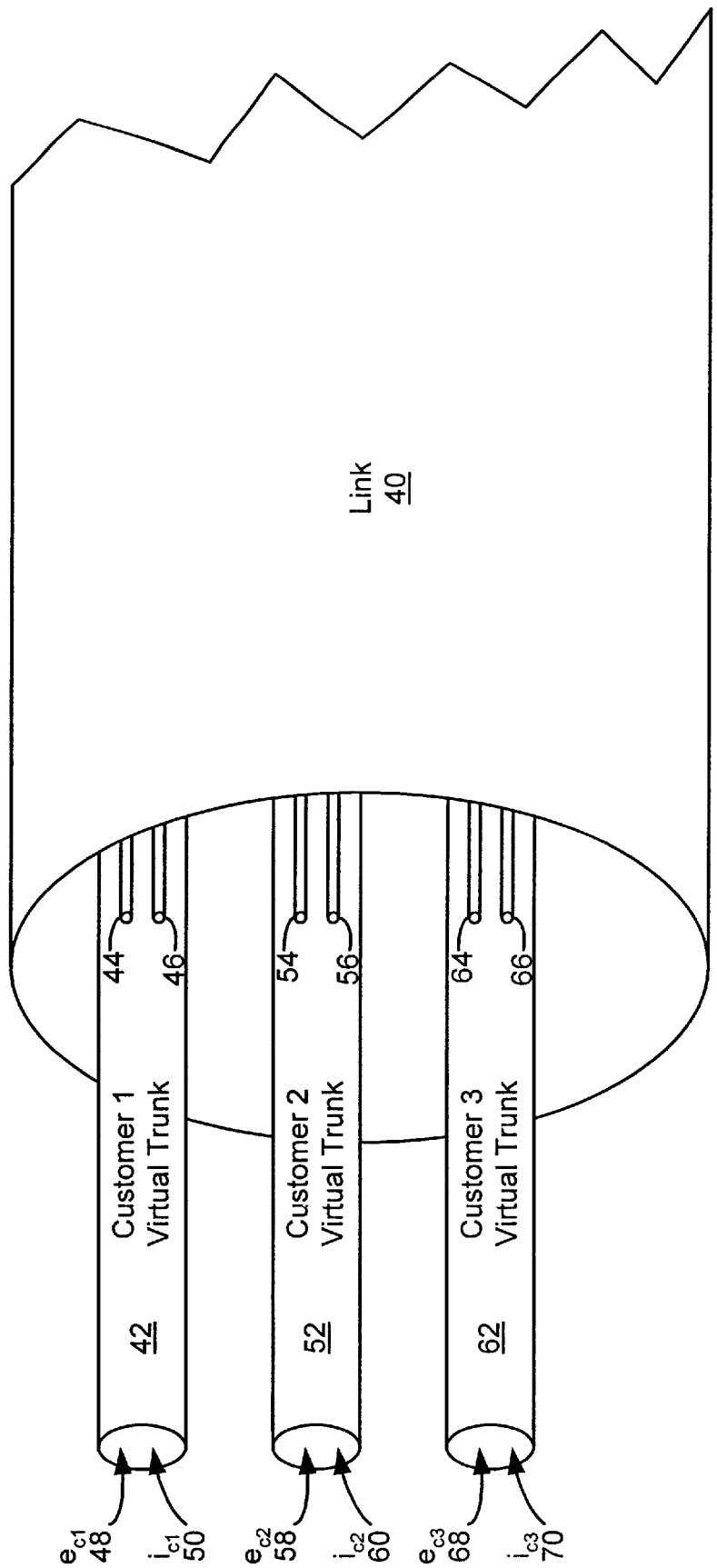
FIG. 3 illustrates a number of virtual trunk connections within a physical trunk.

FIG. 3 shows a communications link 40, which may be provisioned by a network service provider into a number of virtual trunks associated with respective customers. The communications link 40 illustrates the link 11 shown in FIG. 1, as well as the link 23 as shown in FIG. 2. While the examples of FIG. 1 and FIG. 2 show that the communication link 40 may correspond to an ingress and/or egress link, the communications link 40 could also, alternatively, represent an internal link connecting network nodes internal to a given network.

For purposes of example, the link 40, as shown in FIG. 3, represents any communication link for which bandwidth may be provisioned. As shown in FIG. 3, the link 40 is provisioned into a number of virtual trunks, shown for purposes of illustration as a virtual trunk 42 associated with a first customer (customer 1), a virtual trunk 52 associated with a second customer (customer 2), and a virtual trunk 62 associated with a third customer (customer 3). While the link 40 is shown being provisioned into three virtual trunks in FIG. 3, the present invention may be employed generally to subdivide the link 40 into any combination of virtual trunks which would match the various specific customer requirements.

Further as shown in FIG. 3, each of the virtual trunks 42, 52 and 62 includes a pair of virtual connections—one of a first connection type and another of a second connection type. Each connection of the first connection type provides some amount of committed bandwidth, while connections of the second connection type do not provide committed bandwidth. Accordingly, virtual trunk 42 includes a virtual connection 44 of the first connection type, and a virtual connection 46 of the second connection type. Virtual trunk 52 includes a virtual connection 54 of the first connection type and a virtual connection 56 of the second connection type, and virtual trunk 62 includes a virtual connection 64 of the first connection type, and a virtual connection 66 of the second connection type.

During operation of the system shown in FIG. 3, each customer provides some amount of inelastic traffic and elastic traffic to the associated virtual trunk. Specifically, customer 1 provides elastic traffic 48 and inelastic traffic 50 to the virtual trunk 42, customer 2 provides elastic traffic 58 and inelastic traffic 60 to the virtual trunk 52, and customer 3 provides elastic traffic 68 and inelastic traffic 70 to the virtual trunk 62.

The sum of the committed bandwidths for each of the connections of the first connection type may be less than or equal to the overall bandwidth capacity of the link 40. The amount of committed bandwidth provided by each of the connections of the first connection type is provisioned by the service provider to be at least as large as the inelastic traffic requirements of the associated customer. Accordingly, the committed bandwidth for virtual connection 44 of virtual trunk 42 is at least as large as the inelastic traffic 50 provided by customer 1, the committed bandwidth for the virtual connection 56 is at least as large as the inelastic traffic 60 provided by customer 2, and so on.

The bandwidth committed for any one of the virtual connections of the first connection type may further include a component intended to be used to convey any available elastic traffic of the associated customer.

The virtual connections of the first connection type may be embodied using any type of connection which will provide a specified bandwidth with bounded delay variation. For example, in an embodiment in which the link 40 is part of an ATM network, the virtual connections of the first connection type may be embodied using CBR ATM connections. In such an embodiment, the bandwidth commitment for a given virtual connection of the first connection type would equal the Peak Cell Rate (PCR) for that connection. Similarly, the virtual connections of the second connection type may be embodied using any type of connection which does not provide a specified bandwidth commitment. Accordingly, in an embodiment in which the link 40 is part of an ATM network, the virtual connections of the second connection type may be embodied using UBR ATM connections.

In other embodiments, the virtual connections of the second connection type may be embodied using connections which ensure loss free delivery of data units accepted into the network. In such embodiments, the virtual connections of the second type may include or consist of connections over which a loss free flow control technique is employed, such as X.25, or TCP. In another embodiment, in which the link 40 is part of an ATM network, the virtual connections of the second type may consist of Controlled Transfer (CT) ATM connections.

During operation, the committed bandwidth of each virtual trunk is always available to the associated customer. However, in some circumstances, the amount of inelastic traffic offered by a given customer may not completely consume the committed bandwidth of the virtual connection of the first connection type associated with that customer. In such a circumstance, the unused bandwidth may be used to transmit elastic traffic of the same customer, or to transmit elastic traffic from another customer.

Figure 4:
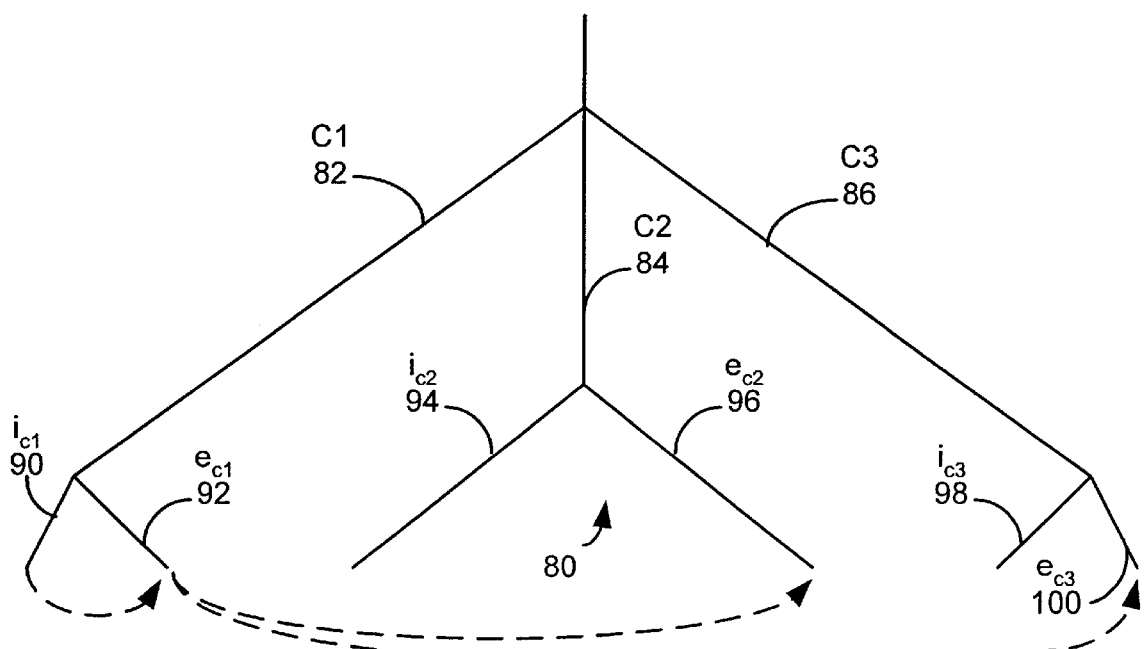
FIG. 4 shows the operation of an illustrative hierarchical scheduler.

FIG. 4 illustrates operation of a hierarchical scheduler, which may be used to allocate bandwidth available on the link 40 shown in FIG. 3. For example, the hierarchical scheduler may be used to allocate transmission opportunities on the link 40 among the virtual connections provisioned over the link 40. As shown in FIG. 4, operation of the hierarchical scheduler results in a tree diagram 80, in which each leaf node of the tree represents a traffic type of a particular customer. Sub-trees of the tree 80 represent the total traffic associated with a particular customer. More specifically, sub-tree 82 represents the traffic for customer 1, sub-tree 84 represents the traffic for customer 2, and sub-tree 86 represents the traffic for customer 3. Each of the customers is shown potentially providing either inelastic traffic, or elastic traffic, or both. For a given transmission opportunity, the hierarchical scheduler selects the next virtual connection to transmit based on a predetermined schedule, as well as the specific configuration of virtual trunks provisioned over the link 40. For example, the transmission opportunities on the link 40 may be allocated based on virtual trunks. In such an embodiment, when a transmission opportunity occurs that is allocated to the virtual trunk associated with customer 1, the hierarchical scheduler first checks for any inelastic traffic ($i_{ci}$ 90) of customer 1. In the event that inelastic traffic is available for transmission from customer 1, then that inelastic traffic is transmitted using the transmission opportunity. In the event that no inelastic traffic is available for transmission from customer 1, the hierarchical scheduler checks for any elastic traffic ($e_{ci}$ 92) from customer 1 that may be available for transmission. If, in that event, the hierarchical scheduler determines there is elastic traffic from customer 1 that is available for transmission, that elastic traffic is transmitted using the transmission opportunity. If the hierarchical scheduler determines that no elastic traffic is available for transmission from customer 1, then the hierarchical scheduler checks for elastic traffic from another virtual trunk, for example elastic traffic ($e_{c2}$ 96) of customer 2. If there is no elastic traffic of customer 2 available for transmission, then the hierarchical scheduler checks for elastic traffic of another virtual trunk, such as elastic traffic ec3 of customer 3, and so forth, potentially checking each of the virtual trunks provisioned over the communications link. Similarly, for subsequent transmission opportunities, in the event that there is no inelastic traffic ($i_{c2}$ 94) for customer 2, or no inelastic traffic ($i_{c3}$ 98) for customer 3, the transmission opportunities may be used to transmit elastic traffic either of the same or a different customer. Thus it is seen that the disclosed hierarchical scheduler, which employs knowledge of the virtual trunks provisioned over the communications link, provides for high multiplexing gains, together with work conserving transfer, within and across virtual trunks with regard to elastic traffic.

Figure 5:
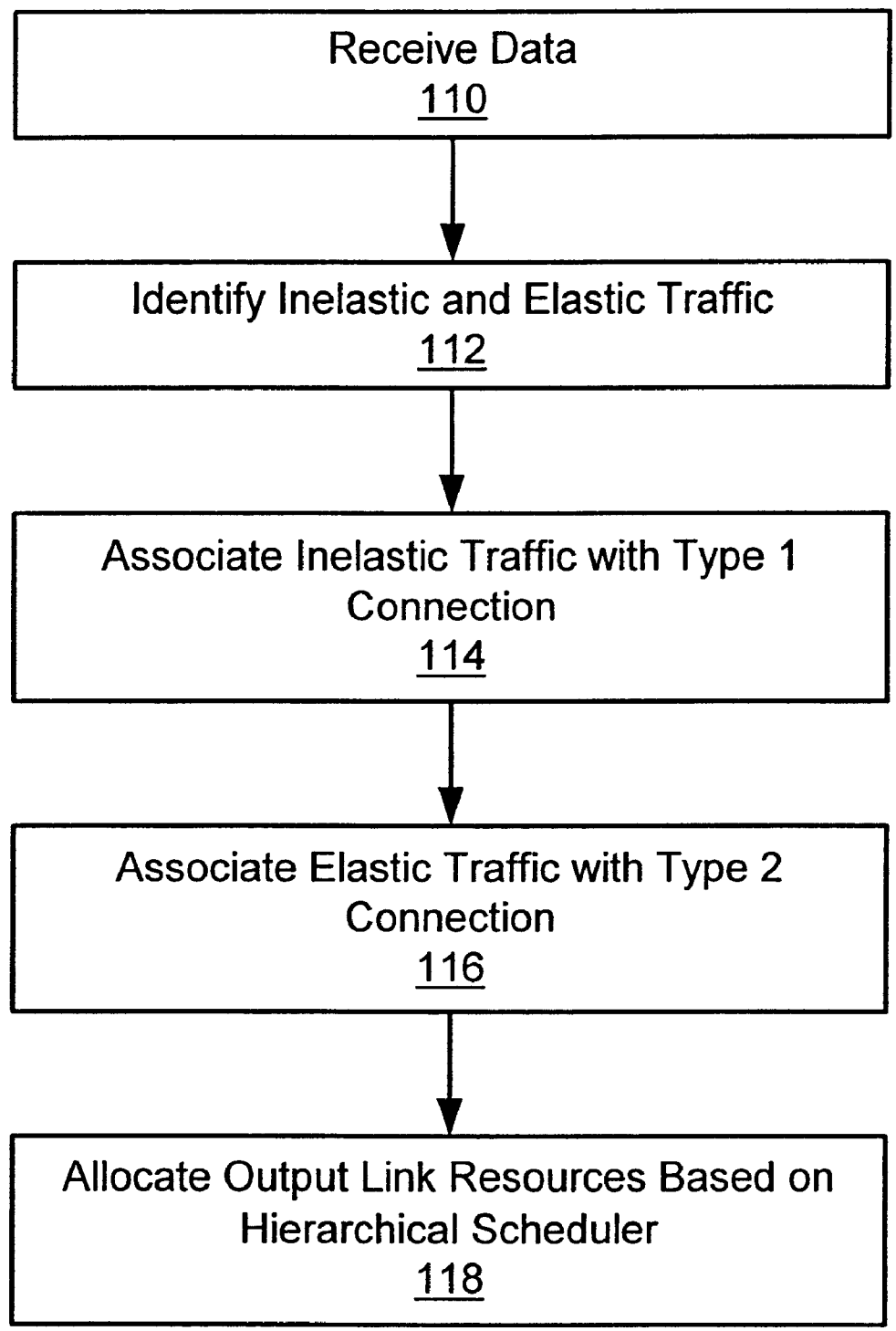
FIG. 5 is a flow chart showing steps performed by an illustrative embodiment of the present invention.

FIG. 5 is a flow chart of steps performed by an illustrative embodiment of the disclosed system. At step 110, the disclosed system receives data. The data received at step 110 may be generated by local applications on an end system such as the traffic source 11 of FIG. 1, or may be received from a computer network such as network A 20 as shown in FIG. 2. The data received at step 110 includes both elastic and inelastic traffic.

At step 112, the disclosed system identifies the inelastic and elastic traffic within the data received at step 110. For example, in the case where the received data consists of data units received from an IP network, the disclosed system may determine the traffic type of individual data units by examination of a codepoint within a Differentiated Services field within the IP header of the packet. The traffic type may alternatively be determined by examining some combination of header field values defining a packet flow. The specific header fields storing values appropriate for distinguishing between different flows for the purpose of determining a traffic type are implementation dependent, and may or may not include the differentiated services field in the IP packet header.

At step 114, the disclosed system associates that portion of the received data determined to be inelastic with a virtual connection of a first connection type, where connections of the first connection type provide an amount of committed bandwidth. At step 116, the disclosed system associates that portion of the received data determined to be elastic with a virtual connection of a second connection type, where connections of the second connection type do not provide any committed bandwidth. Finally, at step 118, the disclosed system allocates output link resources using a hierarchical scheduler, as further described in connection with FIG. 4 above.

Figure 6:
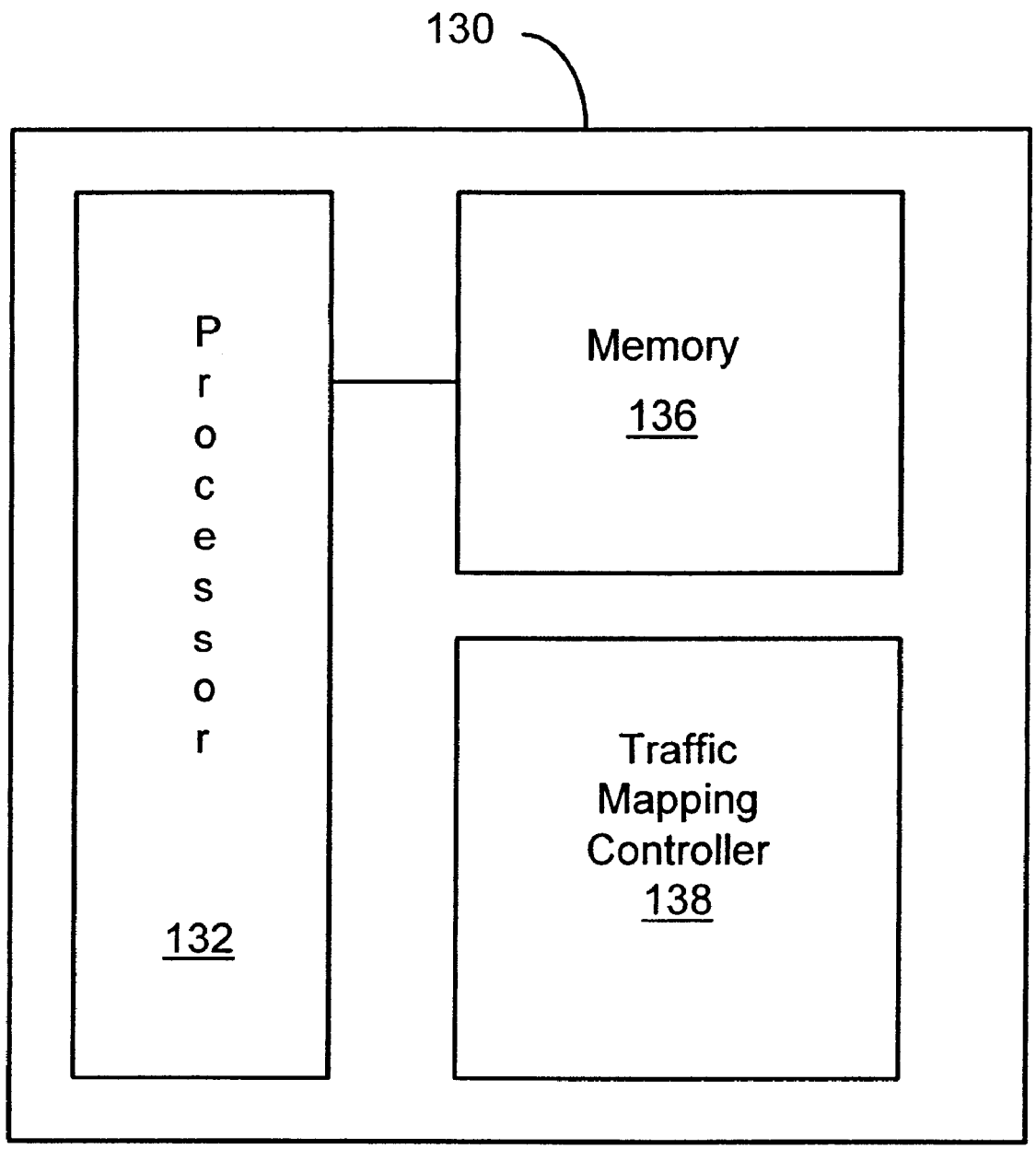
FIG. 6 is a block diagram of an illustrative embodiment of the disclosed system for passing information over a connection oriented network.

FIG. 6 is a block diagram of an illustrative embodiment of the disclosed system for passing information over a connection oriented network. As shown in FIG. 6, the system for passing information over a connection oriented network 130 may include a processor 132, a memory communicably coupled to the processor 132, and a traffic mapping controller 138. While for purposes of illustration the traffic mapping controller 138 is shown outside of the memory 136, it may alternatively consist of program code stored within the memory 136, and executable in connection with the processor 132.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for passing information over a connection oriented network, comprising:

receiving data, said data including inelastic traffic and elastic traffic;

identifying said inelastic traffic and said elastic traffic within said data;

associating said inelastic traffic with at least one virtual connection of a first connection type, wherein said at least one virtual connection of said first connection type provides a predetermined amount of committed bandwidth;

associating said elastic traffic with at least one virtual connection of a second connection type, wherein said at least one virtual connection of said second connection type does not provide committed bandwidth;

wherein said step of receiving data further comprises receiving a plurality of data units, and wherein said inelastic traffic includes at least one inelastic traffic data unit, and wherein said elastic traffic includes at least one elastic traffic data unit;

wherein each of said plurality of data units includes an indication of a traffic type, wherein said traffic type is equal to one of the set consisting of inelastic traffic and elastic traffic, and wherein said step of identifying said inelastic traffic and said elastic traffic further comprises examining said indication of said traffic type within each of said plurality of data units; and wherein said indication of said traffic type within each of said plurality of data units comprises a differentiated services field within an Internet Protocol (IP) header of each of said plurality of data units, and wherein said step of identifying said inelastic traffic and said elastic traffic further comprises examining said differentiated services field.

2. The method of claim 1, wherein said step of identifying said inelastic traffic and said elastic traffic further comprises examining a differentiated services code point within said differentiated services field in order to determine a per hop behavior.

3. The method of claim 2, wherein said per hop behavior consists of one of the group consisting of expedited forwarding and assured forwarding.

4. The method of claim 3, wherein said step of identifying said inelastic traffic and said elastic traffic further comprises identifying a first one of said plurality of data units as inelastic traffic in the event that said differentiated services code point of said first one of said plurality of data units indicates said expedited forwarding per hop behavior.

5. The method of claim 4, wherein said step of identifying said inelastic traffic and said elastic traffic further comprises identifying a second one of said plurality of data units as elastic traffic in the event that said differentiated services code point of said second one of said plurality of data units indicates said assured forwarding per hop behavior.

6. The method of claim 1, further comprising:
wherein said step of associating said inelastic traffic with said at least one virtual connection of said first connection type includes associating said data units of said inelastic traffic type with said at least one virtual connection of said first connection type; and
wherein said step of associating said elastic traffic with said at least one virtual connection of said second connection type includes associating said data units of said elastic traffic type with said at least one virtual connection of said second connection type.

7. The method of claim 1, further comprising providing said committed bandwidth for said at least one virtual connection of said first connection type without loss of data transmitted over said at least one virtual connection of said first connection type in the event that an amount of said inelastic data does not exceed a predetermined maximum data rate associated with said at least one virtual connection of said first connection type.

8. The method of claim 1, further comprising providing said committed bandwidth for said at least one virtual connection of said first connection type with a maximum delay variation for data units transmitted over said at least one virtual connection of said first connection type.

9. The method of claim 1, further comprising providing a flow control mechanism for said elastic traffic associated with said at least one virtual connection of said second connection type.

10. The method of claim 9, further comprising providing a service with no loss due to network congestion for said elastic traffic associated with said at least one virtual connection of said second connection type in the event that said elastic traffic is accepted for transmission.

11. The method of claim 1, further comprising establishing at least one constant bit rate (CBR) virtual connection as said at least one virtual connection of said first connection type.

12. The method of claim 1, further comprising establishing at least one unspecified bit rate (UBR) connection as said at least one virtual connection of said second connection type.

13. The method of claim 1, further comprising establishing at least one Controlled Transfer (CT) connection as said at least one virtual connection of said second connection type.

14. The method of claim 1, further comprising allocating transmission opportunities based on a hierarchical scheduler such that unused transmission opportunities associated with said at least one virtual connection of said first connection type are allocated to said at least one virtual connection of said second connection type.

15. The method of claim 14, further comprising associating said at least one virtual connection of said first connection type and said at least one virtual connection of said second connection type with a first virtual trunk, and wherein said allocating transmission opportunities based on said hierarchical scheduler further comprises allocating said unused transmission opportunities associated with said at least one virtual connection of said first connection type to a virtual connection associated with a second virtual trunk in the event that no data associated with said at least one connection of said second connection type is available for transmission.

16. A system for passing information over a connection oriented network, comprising:
at least one processor;
a memory coupled to said processor;
a traffic mapping controller, wherein said controller operates to
receive data, said data including inelastic traffic and elastic traffic,
identify said inelastic traffic and said elastic traffic within said data,
associate said inelastic traffic with at least one virtual connection of a first connection type, wherein said at least one virtual connection of said first connection type provides a predetermined amount of committed bandwidth, and associate said elastic traffic with at least one virtual connection of a second connection type, wherein said at least one virtual connection of said second connection type does not provide committed bandwidth;
wherein said traffic mapping controller further operates to receive a plurality of data units as said data, wherein said inelastic traffic includes at least one inelastic traffic data unit, and wherein said elastic traffic includes at least one elastic traffic data unit;
wherein each of said plurality of data units includes an indication of a traffic type, wherein said traffic type is equal to one of the set consisting of inelastic traffic and elastic traffic, and wherein said traffic mapping controller further operates to identify said inelastic traffic and said elastic traffic by examining said indication of said traffic type within each of said plurality of data units; and
wherein said indication of said traffic type within each of said plurality of data units comprises a differentiated services field within an Internet Protocol (IP) header of each of said plurality of data units, and wherein said traffic mapping controller further operates to identify said inelastic traffic and said elastic traffic further by examining said differentiated services field.

17. The system of claim 16, wherein said traffic mapping controller further operates to identify said inelastic traffic and said elastic traffic further by examining a differentiated services code point within said differentiated services field in order to determine a per hop behavior, wherein said per hop behavior consists of one of the group consisting of expedited forwarding and assured forwarding.

18. The system of claim 17, wherein said traffic mapping controller further operates to identify said inelastic traffic and said elastic traffic further by identifying a first one of said plurality of data units as inelastic traffic in the event that said differentiated services code point of said first one of said plurality of data units indicates said expedited forwarding per hop behavior.

19. The system of claim 18, wherein said traffic mapping controller further operates to identify said inelastic traffic and said elastic traffic by identifying a second one of said plurality of data units as elastic traffic in the event that said differentiated services code point of said second one of said plurality of data units indicates said assured forwarding per hop behavior.

20. The method of claim 16, further comprising:
wherein said traffic mapping controller further operates to associate said inelastic traffic with said at least one virtual connection of said first connection type by associating said data units of said inelastic traffic type with said at least one virtual connection of said first connection type; and
wherein said traffic mapping controller further operates to associate said elastic traffic with said at least one virtual connection of said second connection type by associating said data units of said elastic traffic type with said at least one virtual connection of said second connection type.

21. The system of claim 16, wherein said traffic mapping controller further operates to provide said committed bandwidth for said at least one virtual connection of said first connection type without loss of data transmitted over said at least one virtual connection of said first connection type in the event that an amount of said inelastic data does not exceed a predetermined maximum data rate associated with said at least one virtual connection of said first connection type.

22. The system of claim 16, wherein said traffic mapping controller further operates to provide said committed bandwidth for said at least one virtual connection of said first connection type with a maximum delay variation for data units transmitted over said at least one virtual connection of said first connection type.

23. The system of claim 16, wherein said traffic mapping controller further operates to provide a flow control mechanism for said elastic traffic associated with said at least one virtual connection of said second connection type.

24. The system of claim 23, wherein said traffic mapping controller further operates to provide a guarantee of delivery for said elastic traffic associated with said at least one virtual connection of said second connection type in the event that said elastic traffic is accepted for transmission, without loss due to network congestion.

25. The system of claim 16, wherein said traffic mapping controller further operates to establish at least one constant bit rate (CBR) virtual connection as said at least one virtual connection of said first connection type.

26. The system of claim 16, wherein said traffic mapping controller further operates to establish at least one unspecified bit rate (UBR) connection as said at least one virtual connection of said second connection type.

27. The system of claim 16, wherein said traffic mapping controller further operates to establish at least one Controlled Transfer (CT) connection as said at least one virtual connection of said second connection type.

28. The system of claim 16, wherein said traffic mapping controller further operates to allocate transmission opportunities based on a hierarchical scheduler such that unused transmission opportunities associated with said at least one virtual connection of said first connection type are allocated to said at least one virtual connection of said second connection type.

29. The system of claim 28, wherein said traffic mapping controller further operates to associate said at least one virtual connection of said first connection type and said at least one virtual connection of said second connection type with a first virtual trunk, and wherein said allocating transmission opportunities based on said hierarchical scheduler further comprises allocating said unused transmission opportunities associated with said at least one virtual connection of said first connection type to a virtual connection associated with a second virtual trunk in the event that no data associated with said at least one connection of said second connection type is available for transmission.

30. The system of claim 16, wherein said traffic mapping controller comprises a software program stored within said memory.

31. The system of claim 16, wherein said traffic mapping controller comprises at least one integrated circuit.

32. The system of claim 16, wherein said traffic mapping controller comprises a software program stored within said memory and at least one integrated circuit.

33. The system of claim 16, wherein said system is embodied within an edge device of said connection oriented network.

34. The system of claim 16, wherein said system is embodied within an end station.

* * * * *

UNITED STATES PATENT AND TRADEMARK OFFICE
CERTIFICATE OF CORRECTION

PATENT NO. : 6,430,154 B1 Page 1 of 1
DATED : August 6, 2002
INVENTOR(S) : Douglas H. Hunt et al.

It is certified that error appears in the above-identified patent and that said Letters Patent is hereby corrected as shown below:

Column 2,
Line 19, "QOS" should read -- QoS --; and

Column 8,
Line 4, "invention." should read -- invention; and --.

Signed and Sealed this

Twenty-fifth Day of March, 2003

JAMES E. ROGAN
*Director of the United States Patent and Trademark Office*